A. L. LEWIS.
HUB.
APPLICATION FILED FEB. 25, 1911.

1,045,712.

Patented Nov. 26, 1912.

Witnesses
Hugh Hott
E. Edwouston Jr.

Inventor
Albert L. Lewis

By Victor J. Evans
Attorney

UNITED STATES PATENT OFFICE.

ALBERT L. LEWIS, OF COALINGA, CALIFORNIA.

HUB.

1,045,712.   Specification of Letters Patent.   Patented Nov. 26, 1912.

Application filed February 25, 1911. Serial No. 610,747.

*To all whom it may concern:*

Be it known that I, ALBERT L. LEWIS, a citizen of the United States, residing at Coalinga, in the county of Fresno and State of California, have invented new and useful Improvements in Hubs, of which the following is a specification.

This invention relates to hubs and more particularly to hubs adapted for use upon bull or calf wheel shafts.

The object of the invention is the provision of a cast hub which may be conveniently and securely mounted upon the end of the bull or calf wheel shaft and which is provided with a shaft journal thereon.

A further object of the invention is the provision of a hub of this character wherein the spokes may be readily held at a tangent to the hub, whereby a direct strain will be placed upon the same in the operation.

Further objects of the invention will appear as the following specific description is read in connection with the accompanying drawings, which form a part of this application, and in which:—

Figure 1:
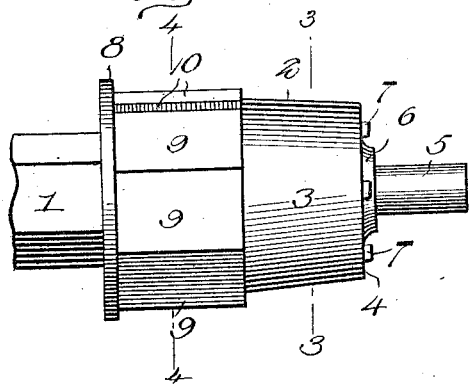
Figure 2:
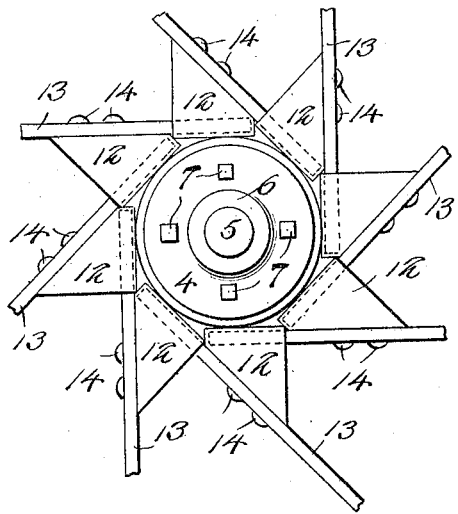
Figure 3:
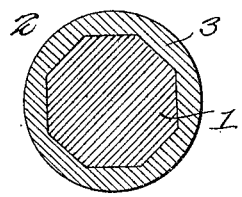
Figure 4:
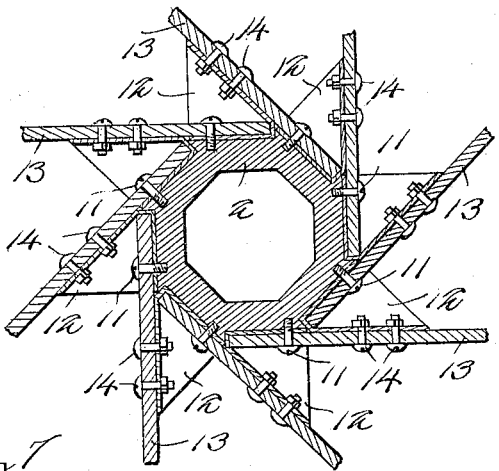
Figure 5:
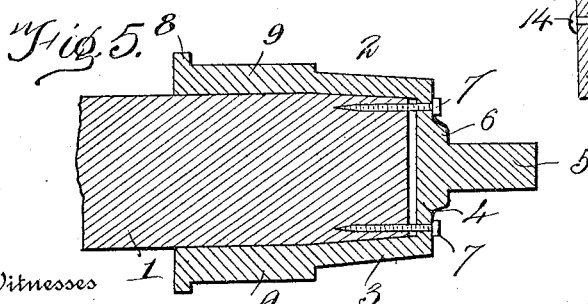

Figure 1 is a side elevation, Fig. 2 is an end elevation with the spoke plates and spokes applied. Fig. 3 is a transverse section on the line 3—3 of Fig. 1. Fig. 4 is a similar section on the line 4—4 of Fig. 1 with the spoke plates and spokes applied. Fig. 5 is a longitudinal section through the hub.

Referring more particularly to the drawing, 1 represents a bull or calf wheel shaft to which the hub 2 is adapted to be secured. The hub 2 is preferably formed by casting the device as a whole and comprises a hollow externally circular body 3 having one end closed as at 4 and projecting therefrom a stud or pintle 5 which forms the journal for the shaft. The connection of the pintle with the closed end is reinforced by an annular boss or shoulder 6.

The inner surface of the hub 2 is preferably formed octagon so as to receive the octagon end of the bull or calf shaft and is inwardly tapered so that the end of the shaft will be wedged therein when drawn into position by the lag screws or stud bolts 7 which pass through the closed end 4 and enter the shaft.

The inner end of the hub is provided with a circular flange 8 and immediately adjacent the flange there is formed, upon the outer surface of the hub, a plurality of tangential shoulders or seats 9 and radial shoulders 10. Mounted upon the seats 9 and secured thereto by lag bolts 11 are substantially triangular hollow lugs 12 to which the spokes 13 of the wheel are secured by means of the bolts 14. The ends of the spokes are constructed so as to enter one lug and to lie upon the next adjacent lug at a tangent to the outer surface of the hub. When the wheel is turning in the direction of the arrow in Fig. 2 it will be noticed that the strain is directed in line with the spokes and that the wheel is therefore rendered very strong.

Having thus described the invention, what I claim as new is:—

1. A hub comprising an integral casing having a polygonal inwardly tapered shaft socket, a plurality of tangential spoke seats, spoke mounting members carried by said seats, lag screws passing through the hub and adapted to engage the shaft for drawing the same into wedging engagement with the tapered socket, and a pintle formed on the hub.

2. A hub comprising an integral casting having a polygonal shaft socket formed therein, a plurality of tangential seats formed on the exterior surface of the hub, spoke mounting members carried by said seats, a journaling pintle formed integral with the hub, and means to secure a shaft in the socket.

In testimony whereof I affix my signature in presence of two witnesses.

ALBERT L. LEWIS.

Witnesses:
ERNEST C. SHUMARD,
A. FULLER.

Copies of this patent may be obtained for five cents each, by addressing the "Commissioner of Patents, Washington, D. C."